Feb. 26, 1946.   R. N. SHONER   2,395,588
SEAL LEAKAGE INDICATOR FOR CONTAINERS
Filed March 25, 1944
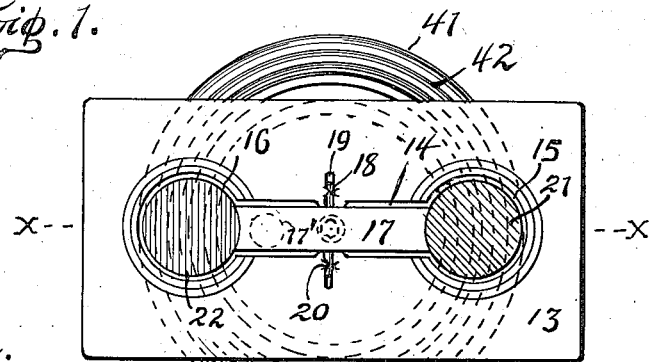
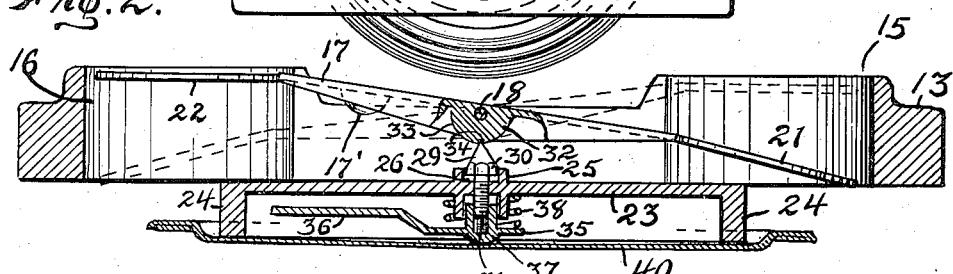
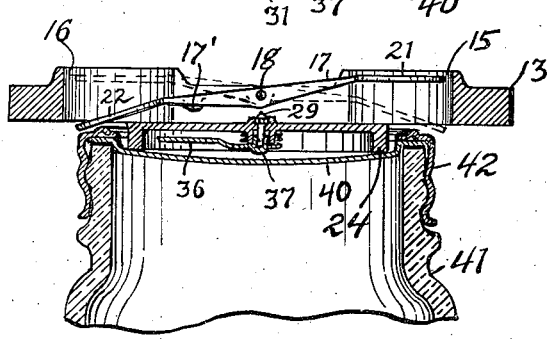
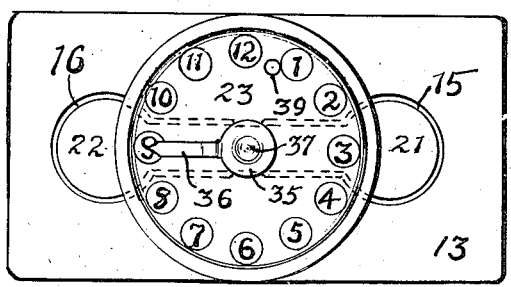
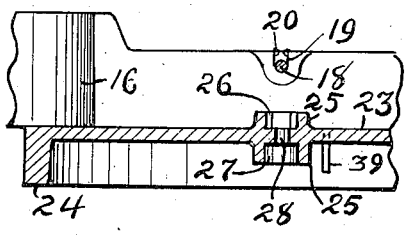
Robert N. Shoner INVENTOR.
BY W. G. Burns Attorney Patented Feb. 26, 1946

2,395,588

UNITED STATES PATENT OFFICE 2,395,588

SEAL LEAKAGE INDICATOR FOR CONTAINERS

Robert N. Shoner, Fort Wayne, Ind.

Application March 25, 1944, Serial No. 528,156

9 Claims. (Cl. 33—169)

This invention relates to improvements in seal leakage indicators for containers and is applicable to that type of container used for preserving food and other perishable substances, and which is closed and sealed by a thin dish-shaped metallic cap usually provided with a gasket lining that is compressed between the cap and the neck of the container wherefore to hermetically seal the container.

Ordinarily, when a sealed container of the type here referred to is filled with heated goods and its cap is applied to close the container, upon subsequent cooling of the contents contraction thereof occurs, whereupon the cap is drawn inwardly and firmly seated in place because of the partial vacuum established within the container. Generally, a sealing cap of the character here involved is made of thin metal and is substantially flat in its midportion and becomes bulged inwardly more or less because of the partial vacuum produced within the container.

An object of the present invention is to provide an instrument by which to indicate whether or not a container, after having been filled with the substance to be preserved, and closed by its cap, has been properly sealed, or if there is leakage between the container and its cap.

Another object of the invention is to provide a leakage detector for a canned goods container that is closed by a flexible cap, which detector has an indicating member operatively associated with a cap contactor and a latch having engagement with the indicating member by which said member is sustained in a definite selected position when the instrument is applied to an imperfectly sealed container.

And a further object of the invention is to afford a leakage detector for cap-sealed containers in which is provided means of adjustment wherefore to adapt the instrument to containers having sealing caps of various proportions or shapes.

Other objects and advantages of the invention appear in the following description.

The illustrative embodiment of the invention is shown in the accompanying drawing, in which:

Fig. 1 is a top plan view of the instrument applied to a container;

Fig. 2 is a vertical elevational view, drawn to an enlarged scale showing a section of the instrument and a sealing cap on which the instrument is mounted, with the indicator in latched position, the section being on the line $x$—$x$ of Fig. 1;

Fig. 3 is a vertical elevational view in section of the structure shown in Fig. 1 on the line $x$—$x$ thereof, the indicator being in position as when the container is properly sealed;

Fig. 4 is a bottom plan view of the instrument; and

Fig. 5 is a fragmentary elevational view of the base for the instrument drawn to an enlarged scale, shown in section on the line $x$—$x$ of Fig. 1.

The illustrative embodiment of the invention consists of a base 13 formed of a flat plate having an elongated aperture 14 therein, the ends of which are enlarged to form sight openings 15 and 16. In the aperture is disposed a teeter-bar 17 which is supported upon a fulcrum pin 18, the ends of which extend loosely into corresponding recesses 19 made in the upper portion of the base, the arrangement being such as to permit the teeter-bar to tilt to and fro upon the axis of the fulcrum pin and to be raised bodily upward to a limited extent, there being provided opposing lugs 20 that overhang the corresponding ends of the fulcrum-pin to limit upward movement thereof in the recesses and to prevent dislodgement of the teeter-bar from the base. One end of the teeter-bar is shaped to provide a seal-indicating disk 21 preferably colored "green," and the opposite end of the teeter-bar is likewise shaped to provide a leak indicating disk 22 preferably colored "red" in contra-distinction from the seal-indicating disk. The disks are disposed angularly in divergent planes with respect to the midportion of the teeter-bar so that said disks when in their uppermost positions are disposed in horizontal planes within the upper ends of their sight openings in the base for clear observation by the operator.

In connection with the lower face of the base 13 is a circular plate 23 having a peripheral downwardly extending flange constituting a foot 24 for the base 13. The plate has a hub 25 the upper end of which projects into the aperture 14 and has made therein a polygonal socket 26. The lower end of the hub has an axial bore 27 and a continuation 28 thereof extending through the plate 23 into said socket.

A latch 29 is disposed for axial movement in the hub and is provided with a polygonal head 30 that is normally seated in the socket 26 thereof and has a stem 31 that extends loosely into the bore of the hub. The upper end of the latch is pointed, and the teeter-bar 17 has a pendent lug 32 having a face 33 that extends concentrically with respect to the fulcrum pin, and bears upon the pointed end of the latch when the latch is in elevated position so the load of the teeter-bar is then borne by the latch. In the face 33 of the lug 32 is made a shallow groove 34 extending parallel with the axis of the fulcrum pin and is suitably located on the lug to receive the pointed end of the latch when the teeter-bar is tilted to a selected inclination, as when the indicating disk 21 is in its lowermost position in the corresponding sight opening 15. The latch by engagement in the groove serves to yieldingly detain the teeter-bar in a selected position until the latch is lowered out of contact with the lug.

An adjuster 35 is arranged in threaded connection with the stem 31 of the latch and is provided with a laterally extending arm 36 that underlies the plate 23 that has arranged on its under face an annular series of indicating characters one (1) to twelve (12) inclusive equally spaced apart.

The adjuster has thereon a pendent protuberance alined with the axis of the stem constituting a contactor 37 for the purpose hereinafter referred to, and there is arranged a compression spring 38 encompassing the hub 25 disposed between the lower face of the plate 23 and the adjuster 36 wherefore to yieldingly urge the adjuster and the latch downwardly thus to normally withhold the latch from engagement with the teeter-bar.

The polygonal head 30 of the latch is seated loosely in the socket 26 so that rotation of the latch relative to the base when the latch is seated is prevented. By raising the adjuster in opposition to restraint of the spring 38 the head 30 of the latch is raised clear from the socket whereupon the latch may be rotated in one direction or the other, relative to the adjuster, thus to increase or decrease the distance between the point of the latch and the contactor 37 accordingly as turned.

Preferably, there is provided a stop 39 that projects downwardly from the underface of the plate 23 into the path of the arm 36 of the adjuster, wherefore to intercept the adjuster and thus establish a definite starting point from which to maneuver the adjuster. When the arm 36 of the adjuster is turned to the indicating character 1 and against the stop, the contactor then is disposed suitably for engagement with an ordinary dished cap 40 on a container 41, and by turning the adjuster arm clockwise from one indicating character to another, the adjuster 35 is screwed upwardly onto the stem of the latch to a corresponding extent thus raising the contactor 37 to suit the particular depth of the sealing cap to be tested. The depth of the dished caps vary more or less in the products of different manufacturers, and turning of the adjuster on the latch to an appropriate one of the indicating characters renders the instrument adaptable to any of the various makes of containers that are sealed by dish-shaped caps of various depths.

In using the invention the container 41 is filled with heated food to be preserved therein and closed by a cap 40 secured in place on the neck of the container in the customary manner by a sealing ring 42. The arm 36 of the adjuster is then turned to a selected one of the indicating characters on the underface of the disk 35 correspondingly to suit the particular characteristics of the make of container. Upon cooling of the closed container, in the event there is no leakage of the seal between the cap and container, partial vacuum is produced within the container causing the midportion of the cap to bulge inwardly from its normal plane. The instrument is then placed in seal testing position so that the foot is concentrically disposed on the upper face of the cap. The contractor, when properly adjusted, then is suspended out of contact with the bulged cap, and the latch head is held seated in its socket and its point out of engagement with the lug 32, leaving the teeter-bar free to tilt on the axis of its fulcrum pin 18. The teeter-bar is provided with a weight 17' located thereon between its fulcrum and its leak indicating disk 22 whereby the teeter-bar normally assumes an inclination such that the seal indicating disk 21 is then disposed in its uppermost position in its sight opening 15 in clear view of the operator. The seal indicating disk is then manually depressed to its lowermost position in the sight opening and then released, whereupon the teeter-bar automatically assumes its normal inclination again exposing the seal indicating disk to view, thus signifying the container to have been hermetically sealed. If, however, the seal is faulty and there is leakage of the container, the cap thereupon retains its normal flatness and the contactor 37 rests thereon causing elevation of the latch into contact with the lug 32 so the teeter-bar is bodily supported thereon with the seal indicating disk exposed in the upper end of its sight opening 15. Then, when the seal indicating disk 21 is depressed by the operator to its lowermost position, the point of the latch is received in the groove 34 detaining the teeter-bar in an oppositely inclined position so the leak-indicating disk 22 then is held in exposed position in the upper end of its sight opening 16 in clear view, thus indicating the container not to have been hermetically sealed. By these manipulations of the instrument is determined simply and with certainty whether or not the container shall have been effectively sealed and in proper condition for storage.

Variations from the particular construction above disclosed may be resorted to by the exercise of skill in the art, without departure from the scope of the invention:

What I claim is:

1. A seal leakage detector for a container that is closed by a flexible sealing cap, said detector consisting of an apertured base having sight openings therein and provided with a circular pendent flange constituting a foot, a teeter-bar having a fulcrum pin the ends of which are disposed loosely in recesses made in said base, and having a lug with a face concentric with said pin provided with a groove therein parallel with the axis of said pin, the ends of said teeter-bar being shaped to provide indicating disks disposed within said sight openings that are exposed selectively at the upper ends thereof accordingly as the teeter-bar is tilted, and a latch, normally seated in said base, having a pointed end engageable with said lug when the latch is raised, and which enters said groove when the teeter-bar is moved to a selected position wherefore to detain said teeter-bar in said position, said latch being provided with a contactor adapted to engage a sealing cap for a container when said base is concentrically positioned thereon, the arrangement being such that the latch is permitted to seat in the base or is raised into engaging position with the teeter-bar accordingly as the cap is not or is flexed.

2. A seal leakage detector for a flexible cap of a container consisting of an apertured base provided with opposite sight openings, a teeter-bar having a fulcrum pin loosely supported in said base and provided at its ends with indicating disks disposed respectively in said sight openings that are exposed at the upper ends thereof selectively accordingly as the teeter-bar is tilted, a latch movably disposed in said base, upon which the teeter-bar rests, when the latch is in raised position, and is thereby secured when in to a selected position, and a spring-pressed contactor adjustably connected with said latch adapted to engage said sealing cap when said base is concentrically positioned thereon and the cap is not flexed, to cause engagement of the latch with the teeter-bar, the arrangement being such that said contactor and latch are withheld respectively from engagement with the cap and teeter-bar when said cap is flexed.

3. A seal leakage indicator for a flexible cap of a container consisting of an apertured base provided with opposite sight openings and a pendent circular flange constituting a foot, a teeter-bar pivotally supported in said base, weighted to tilt normally in one direction, and having on its opposite ends a leak indicator and a seal indicator respectively, disposed in the corresponding sight openings arranged to selectively appear at the upper ends of said openings accordingly as the teeter-bar is tilted, and a latch movably disposed in said base adapted to engage the teeter-bar when the latch is raised and to detain said teeter-bar when moved to a selected position, and being provided with a contactor engageable with the sealing cap of a container when the foot of the base is disposed on said cap and the cap is not flexed so that said latch is thereby raised into engagement with the teeter-bar.

4. A seal leakage indicator for a container having a flexible sealing cap, said indicator consisting of a base provided with a flange constituting a foot, a teeter-bar pivotally supported on said base, weighted to tilt normally in one direction, and having opposite indicators disposed to be selectively displayed accordingly as the teeter-bar is tilted, and a latch movably disposed in said base adapted to engage the teeter-bar when the latch is raised and detain said teeter-bar in a selected indicating position, and being provided with a contactor adapted to bear against said cap when said foot is positioned on the cap and the cap is not flexed, thus to raise said latch into engagement with the teeter-bar.

5. In a seal leakage indicator for a container having a flexible sealing cap, said indicator consisting of a chambered base having opposite sight openings and provided with a pendent circular foot, a teeter-bar pivoted in said base, weighted to tilt normally in one direction, an indicator signifying leakage on said teeter-bar disposed in one of said sight openings in normally exposed position, another indicator to signify the container to have been sealed disposed in the other of said sight openings in normally obscured position, a latch movably disposed in said base adapted to engage the teeter-bar when said latch is raised and thereby detain said teeter-bar when moved to leakage indicating position, and a contactor adjustably connected with the latch, engageable with said cap when the base is positioned with its foot resting thereon while the cap is not flexed, thus to and cause movement of the latch into engagement with the teeter-bar.

6. In a seal leakage indicator for the cap of a container consisting of a base having a foot adapted to be positioned upon said cap, a teeter-bar pivotally supported in connection with the base, weighted to tilt normally in one direction and provided with opposite indicators, respectively to signify proper sealing of the cap or leakage thereof, and movable selectively into indicating position accordingly as the teeter-bar is tilted, and a latch movably supported in the base, engageable with said teeter-bar, and provided with a contacting member adapted to be engaged or not with the container cap when the foot of the base is seated concentrically thereon, accordingly as said cap is not flexed or is flexed.

7. A seal leakage indicator for the cap of a container consisting of a base adapted to be positioned upon said cap, a teeter-bar pivoted in said base provided with indicators respectively to signify the cap of the container has been properly sealed or not, and a latch movably mounted in the base having a contactor adapted to engage said cap when said base is positioned thereon and the cap is not flexed, whereby said latch is moved into engagement with said teeter-bar, thus to detain the teeter-bar when moved into leakage indicating position.

8. In a seal leakage indicator for a container cap that has a normally flat flexible midportion, a base having a foot adapted to be positioned on said midportion, a teeter-bar pivotally supported in connection with the base, having a leakage indicator and a seal indicator arranged to be selectively displayed in indicating positions accordingly as said teeter-bar is tilted, a latch member axially movable in said base adapted for engagement with said teeter-bar, a dial on the bottom face of said base provided with a series of indicating characters thereon, and a contactor adjustably mounted on said member provided with an extending arm adapted to be moved selectively into indicating positions with respect to said characters concurrently with adjustment of said contactor, said contactor being adapted to have engagement with the midportion of said cap when said base is positioned thereon while said midportion is not flexed, thus to cause movement of said member into engagement with said teeter-bar, thus to prevent tilting thereof when moved into leakage indicating position.

9. In a seal leakage indicator for a container cap that has a normally flat flexible midportion, a base having a foot adapted to be positioned on said midportion of the cap, a teeter-bar pivotally supported in connection with the base, having a leakage indicator and a seal indicator arranged to be selectively displayed in indicating positions accordingly as said teeter-bar is tilted, and a member movably mounted in said base adapted to bear upon the cap when the base is in operative position thereon while the midportion of the cap is not flexed, and cause said member to engage said teeter-bar, thus to detain it when moved into leakage indicating position.

ROBERT N. SHONER.